(12) United States Patent
Koike et al.

(10) Patent No.: US 10,346,639 B2
(45) Date of Patent: Jul. 9, 2019

(54) ANONYMIZATION IDENTIFIER COMPUTING SYSTEM

(71) Applicants: KABUSHIKI KAISHA TOSHIBA, Minato-ku (JP); TOSHIBA SOLUTIONS CORPORATION, Kawasaki-shi (JP)

(72) Inventors: Masanobu Koike, Tama (JP); Pakin Osotkraphun, Inagi (JP); Fumihiko Sano, Kawasaki (JP); Michiyo Ikegami, Fuchu (JP); Yuuki Kaseda, Hachioji (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 185 days.

(21) Appl. No.: 15/235,887

(22) Filed: Aug. 12, 2016

(65) Prior Publication Data

US 2016/0350558 A1    Dec. 1, 2016

Related U.S. Application Data

(63) Continuation of application No. PCT/JP2015/053627, filed on Feb. 10, 2015.

(30) Foreign Application Priority Data

Feb. 13, 2014    (JP) .................... 2014-025891

(51) Int. Cl.
*G06F 21/00*    (2013.01)
*G06F 21/62*    (2013.01)

(52) U.S. Cl.
CPC .............. *G06F 21/6254* (2013.01)

(58) Field of Classification Search
CPC .................................... G06F 21/6254
See application file for complete search history.

(56) References Cited

U.S. PATENT DOCUMENTS

2010/0332537 A1* 12/2010 El Emam .......... G06F 17/30522
707/771
2013/0138676 A1    5/2013 Bezzi
(Continued)

FOREIGN PATENT DOCUMENTS

JP    2005-234866    9/2005
JP    2007-219636    8/2007
(Continued)

OTHER PUBLICATIONS

Personal Information Anonymous Foundation, Ministry of Economy, Trade and Industry, 2009, 3 Pages.
(Continued)

*Primary Examiner* — Brandon S Hoffman
*Assistant Examiner* — Thong P Truong
(74) *Attorney, Agent, or Firm* — Oblon, McClelland, Maier & Neustadt, L.L.P.

(57) ABSTRACT

An anonymization indicator computation system of the embodiment includes a data storing device, an anonymization device, an anonymization degree computation device, and an addition degree computation device. The data storing device stores original data including a value for each item for each person. The anonymization device generates anonymized data from the original data by anonymizing values of part of items in the original data. The anonymization degree computation device computes the anonymization degree indicating a degree of anonymizing data based on the anonymized data. The addition degree computation device computes the data addition degree indicative of a probability of generating the anonymized data from the original data.

4 Claims, 16 Drawing Sheets

(56) References Cited

U.S. PATENT DOCUMENTS

2014/0201847 A1 7/2014 Ito et al.
2014/0275807 A1* 9/2014 Redei .................. A61B 5/0022
　　　　　　　　　　　　　　　　　　　　　　600/300

FOREIGN PATENT DOCUMENTS

| JP | 2009-181207 | 8/2009 |
| JP | 2010-97336 | 4/2010 |
| JP | 2011-133958 | 7/2011 |
| JP | 2011-209800 | 10/2011 |
| JP | 2012-3440 | 1/2012 |
| JP | 2012-159982 | 8/2012 |
| WO | WO 2013/031997 A1 | 3/2013 |

OTHER PUBLICATIONS

The external specification of the Personal information anonymous foundation, Hitachi Consulting Co., Ltd., 2009, 6 Pages.
International Search Report dated Mar. 24, 2015 in PCT/JP2015/053627, filed on Feb. 10, 2015 (with English Translation).
Written Opinion dated Mar. 24, 2015 in PCT/JP2015/053627, filed on Feb. 10, 2015.

* cited by examiner

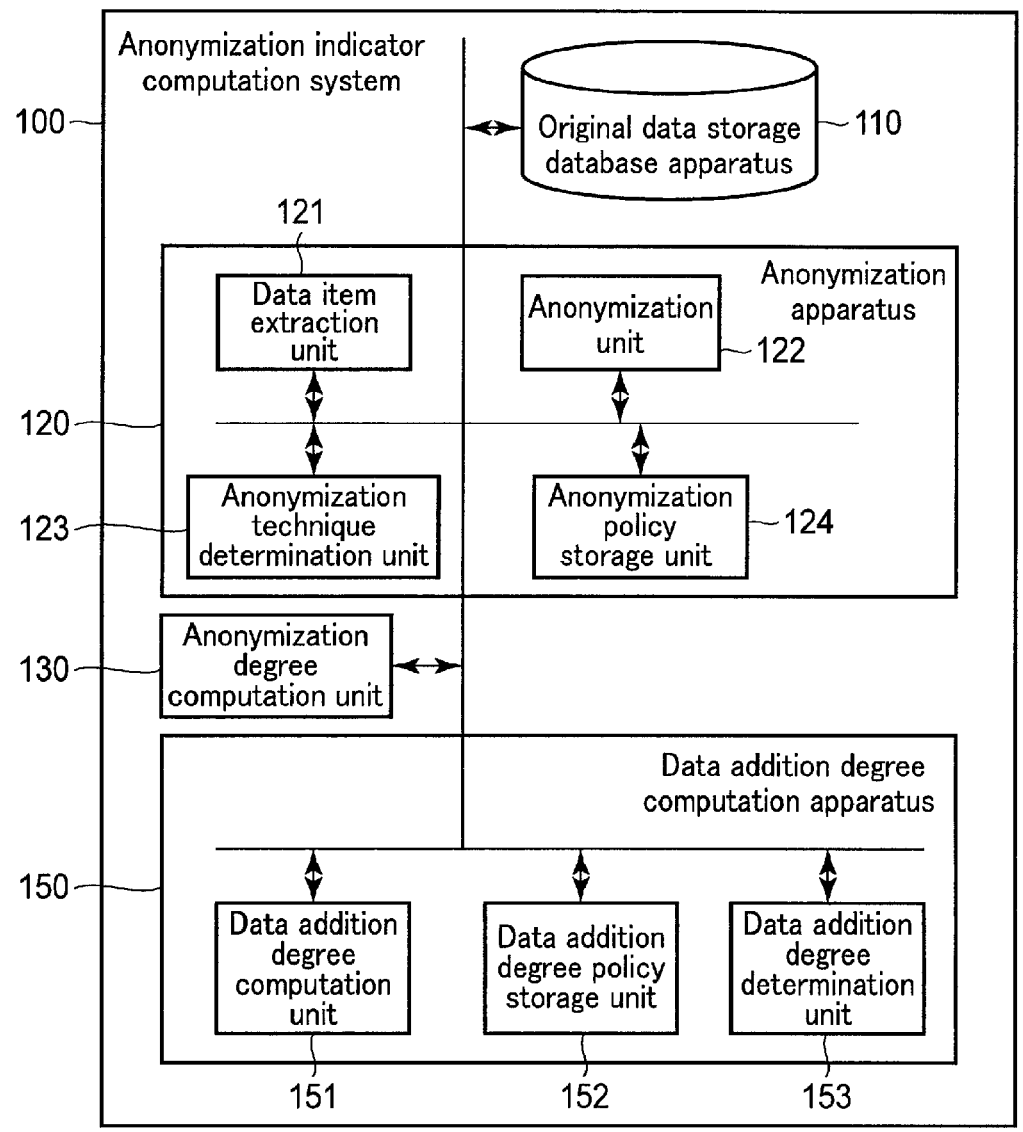
F I G. 1

Anonymization policy PA

| Application order | Anonymization target item | Anonymization technique |
|---|---|---|
| 1 | Age | Grouping (5-year increments) |
| 1 | Address | Generalization (prefecture) |
| 2 | Age | Grouping (10-year increments) |
| 3 | Age | Grouping (15-year increments) |
| 4 | Address | Generalization (country) |
| 5 | Gender | Generalization (any) |

F I G. 2

Anonymized data DA2

| Age | Gender | Address | Disease |
|---|---|---|---|
| Twenties | Female | Kanagawa | Cold |
| Twenties | Female | Kanagawa | Influenza |
| Twenties | Male | Tokyo | Influenza |
| Twenties | Male | Tokyo | Rubella |
| Thirties | Male | Kanagawa | Rubella |
| Thirties | Male | Kanagawa | Rubella |
| Thirties | Male | Kanagawa | Rubella |
| Thirties | Female | Tokyo | Cold |
| Thirties | Female | Tokyo | Stomachache |
| Forties | Female | Kanagawa | Fracture |
| Forties | Female | Kanagawa | Influenza |
| Forties | Male | Tokyo | Influenza |
| Forties | Male | Tokyo | Diabetes |
| Fifties | Male | Tokyo | Cold |
| Fifties | Male | Tokyo | Diabetes |

F I G. 3

Anonymized data DA2'

| Age | Gender | Address | Disease |
|---|---|---|---|
| Twenties | Male | Kanagawa | Fracture |
| Twenties | Female | Kanagawa | Influenza |
| Twenties | Male | Kanagawa | Rubella |
| Twenties | Male | Kanagawa | Rubella |
| Thirties | Female | Kanagawa | Cold |
| Thirties | Male | Tokyo | Rubella |
| Thirties | Female | Tokyo | Stomachache |
| Thirties | Male | Tokyo | Rubella |
| Thirties | Female | Tokyo | Influenza |
| Forties | Male | Tokyo | Rubella |
| Forties | Female | Tokyo | Cold |
| Forties | Female | Tokyo | Fracture |
| Forties | Female | Tokyo | Influenza |
| Fifties | Male | Tokyo | Diabetes |
| Fifties | Female | Tokyo | Influenza |

DL2 (upper block: Twenties rows)
DL2 (lower block: Thirties Male Tokyo through Fifties Male Tokyo)

F I G. 6

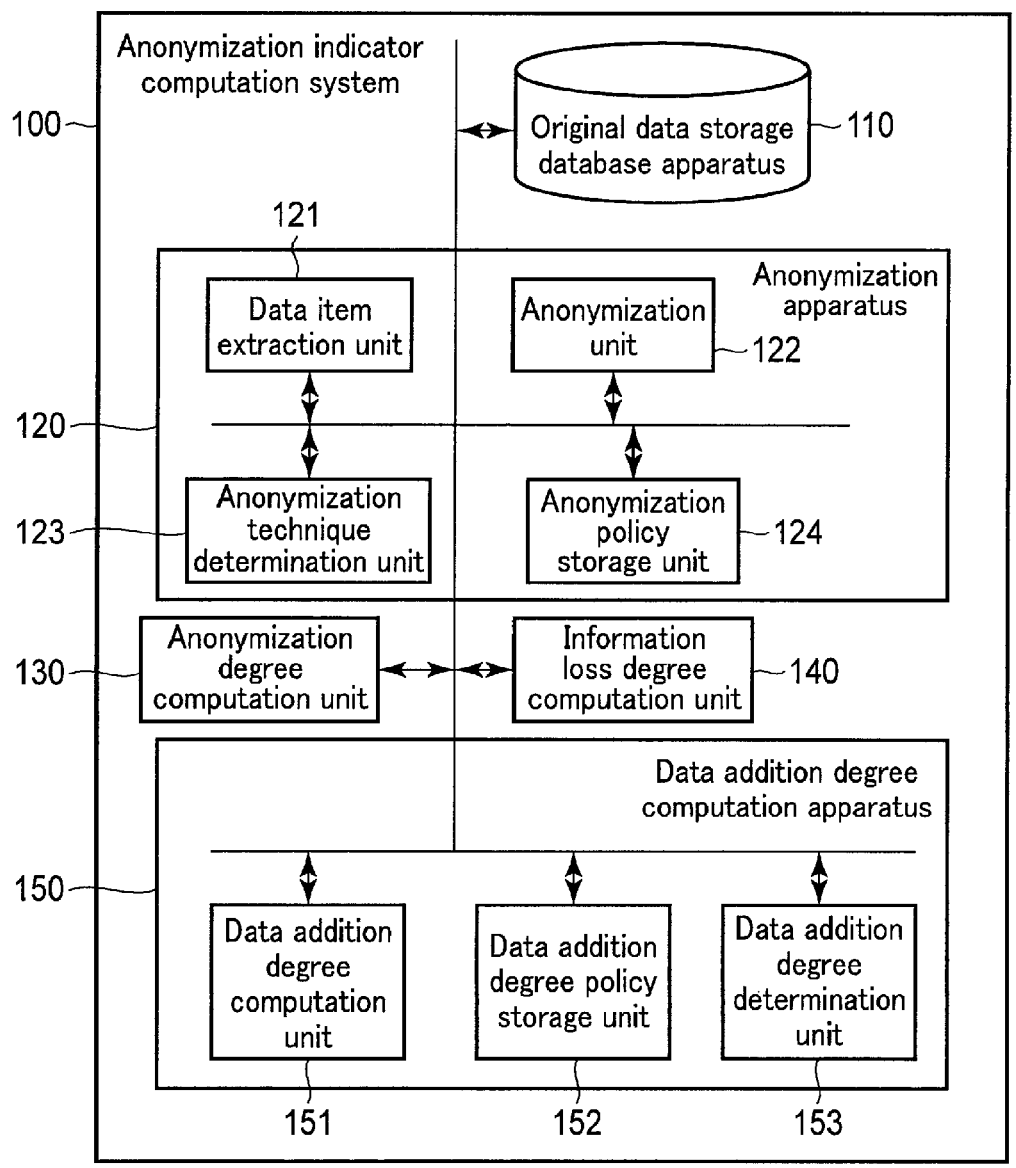
F I G. 7

Data addition degree policy PD'

| Anonymization indicator | Condition |
|---|---|
| Anonymization degree | k=2 or more |
| Information loss degree | 30% or less |
| Data addition degree | 40% or more |

Computation result table T1

| Age | Gender | Address |
|---|---|---|
| 0/29 | 0/1 | 1/2 |
| 3/29 | 0/1 | 1/2 |
| 1/29 | 0/1 | 1/2 |
| 3/29 | 0/1 | 1/2 |
| 2/29 | 0/1 | 1/2 |
| 2/29 | 0/1 | 1/2 |
| 3/29 | 0/1 | 1/2 |
| 2/29 | 0/1 | 1/2 |
| 3/29 | 0/1 | 1/2 |
| 3/29 | 0/1 | 1/2 |
| 4/29 | 0/1 | 1/2 |
| 1/29 | 0/1 | 1/2 |
| 4/29 | 0/1 | 1/2 |
| 2/29 | 0/1 | 1/2 |
| 4/29 | 0/1 | 1/2 |

F I G. 10

Computation result table T2

| Age | Gender | Address |
|---|---|---|
| 5/29 | 0/1 | 1/2 |
| 8/29 | 0/1 | 1/2 |
| 6/29 | 0/1 | 1/2 |
| 8/29 | 0/1 | 1/2 |
| 2/29 | 0/1 | 1/2 |
| 2/29 | 0/1 | 1/2 |
| 3/29 | 0/1 | 1/2 |
| 7/29 | 0/1 | 1/2 |
| 8/29 | 0/1 | 1/2 |
| 3/29 | 0/1 | 1/2 |
| 4/29 | 0/1 | 1/2 |
| 6/29 | 0/1 | 1/2 |
| 9/29 | 0/1 | 1/2 |
| 2/29 | 0/1 | 1/2 |
| 4/29 | 0/1 | 1/2 |

F I G. 11

Table T3

| Age | Gender | Address | Value |
|---|---|---|---|
| 20-22 | Any | Any | 0 |
| 23-24 | Any | Any | 0.05 |
| 25-29 | Male | Any | 0.10 |
| 25-29 | Female | Any | 0.05 |
| 30-39 | Any | Any | 0.35 |
| 40-49 | Any | Any | 0.30 |
| 50-54 | Male | Any | 0.10 |
| 50-54 | Female | Any | 0.05 |
| 55-59 | Any | Any | 0 |

F I G. 13

Original data D

| Age | Gender | Address | Disease |
|---|---|---|---|
| 25 | Female | Yokohama-shi | Cold |
| 28 | Female | Yokohama-shi | Influenza |
| 26 | Male | Fuchu-shi | Influenza |
| 28 | Male | Fuchu-shi | Rubella |
| 32 | Male | Kawasaki-shi | Rubella |
| 32 | Male | Kawasaki-shi | Rubella |
| 33 | Male | Kawasaki-shi | Rubella |
| 37 | Female | Ome-shi | Cold |
| 38 | Female | Fuchu-shi | Stomachache |
| 43 | Female | Kawasaki-shi | Fracture |
| 44 | Female | Yokohama-shi | Influenza |
| 46 | Male | Minato-ku | Influenza |
| 49 | Male | Minato-ku | Diabetes |
| 52 | Male | Fuchu-shi | Cold |
| 54 | Male | Minato-ku | Diabetes |

F I G. 15

Anonymized data DA1

| Age | Gender | Address | Disease |
|---|---|---|---|
| 25-29 | Female | Kanagawa | Cold |
| 25-29 | Female | Kanagawa | Influenza |
| 25-29 | Male | Tokyo | Influenza |
| 25-29 | Male | Tokyo | Rubella |
| 30-34 | Male | Kanagawa | Rubella |
| 30-34 | Male | Kanagawa | Rubella |
| 30-34 | Male | Kanagawa | Rubella |
| 35-39 | Female | Tokyo | Cold |
| 35-39 | Female | Tokyo | Stomachache |
| 40-44 | Female | Kanagawa | Fracture |
| 40-44 | Female | Kanagawa | Influenza |
| 45-49 | Male | Tokyo | Influenza |
| 45-49 | Male | Tokyo | Diabetes |
| 50-54 | Male | Tokyo | Cold |
| 50-54 | Male | Tokyo | Diabetes |

F I G. 16

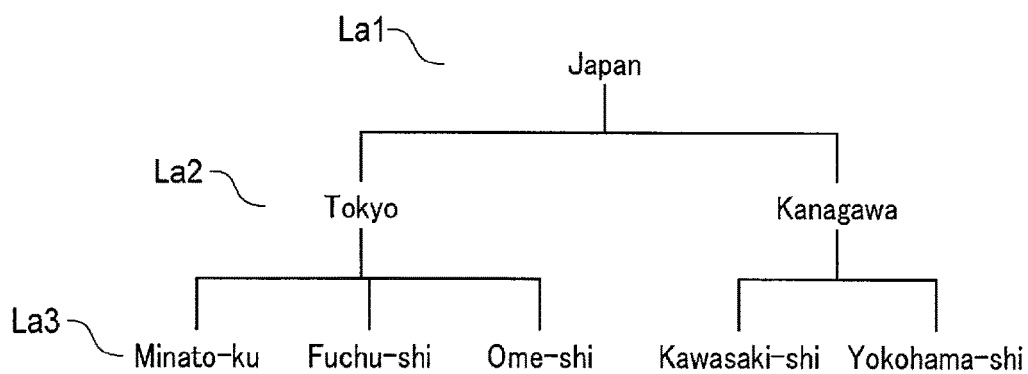

F I G. 17

New data D'

| Age | Gender | Address | Disease |
|---|---|---|---|
| 23 | Male | Yokohama-shi | Fracture |
| 27 | Female | Kawasaki-shi | Influenza |
| 28 | Male | Kawasaki-shi | Rubella |
| 31 | Male | Yokohama-shi | Rubella |
| 32 | Female | Kawasaki-shi | Cold |
| 34 | Male | Ome-shi | Rubella |
| 35 | Female | Fuchu-shi | Stomachache |
| 38 | Male | Fuchu-shi | Rubella |
| 39 | Female | Ome-shi | Influenza |
| 41 | Male | Minato-ku | Rubella |
| 43 | Female | Fuchu-shi | Cold |
| 47 | Female | Minato-ku | Fracture |
| 48 | Female | Fuchu-shi | Influenza |
| 49 | Male | Fuchu-shi | Diabetes |
| 52 | Female | Minato-ku | Influenza |

F I G. 18

Anonymized data DA3
| Age | Gender | Address | Disease |
|---|---|---|---|
| 23-27 | Any | Kanagawa | Fracture |
| 23-27 | Any | Kanagawa | Influenza |
| 28-32 | Any | Kanagawa | Rubella |
| 28-32 | Any | Kanagawa | Rubella |
| 28-32 | Any | Kanagawa | Cold |
| 33-37 | Any | Tokyo | Rubella |
| 33-37 | Any | Tokyo | Stomachache |
| 38-42 | Any | Tokyo | Rubella |
| 38-42 | Any | Tokyo | Influenza |
| 38-42 | Any | Tokyo | Rubella |
| 43-47 | Any | Tokyo | Cold |
| 43-47 | Any | Tokyo | Fracture |
| 48-52 | Any | Tokyo | Influenza |
| 48-52 | Any | Tokyo | Diabetes |
| 48-52 | Any | Tokyo | Influenza |
F I G. 19
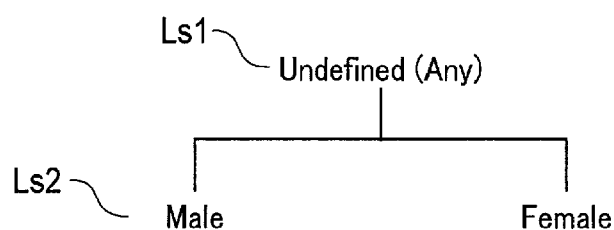
F I G. 20

Anonymized data DA1'

| Age | Gender | Address | Disease |
|---|---|---|---|
| 20-24 | Male | Kanagawa | Fracture |
| 25-29 | Female | Kanagawa | Influenza |
| 25-29 | Male | Kanagawa | Rubella |
| 30-34 | Male | Kanagawa | Rubella |
| 30-34 | Female | Kanagawa | Cold |
| 34-34 | Male | Tokyo | Rubella |
| 35-39 | Female | Tokyo | Stomachache |
| 35-39 | Male | Tokyo | Rubella |
| 35-39 | Female | Tokyo | Influenza |
| 40-44 | Male | Tokyo | Rubella |
| 40-44 | Female | Tokyo | Cold |
| 45-49 | Female | Tokyo | Fracture |
| 45-49 | Female | Tokyo | Influenza |
| 45-49 | Male | Tokyo | Diabetes |
| 50-54 | Female | Tokyo | Influenza |

F I G. 21

ANONYMIZATION IDENTIFIER COMPUTING SYSTEM

CROSS-REFERENCE TO RELATED APPLICATIONS

This application is a Continuation application of PCT application No. PCT/JP2015/053627, filed on Feb. 10, 2015, and is based upon and claims the benefit of priority from Japanese Patent Application No. 2014-025891, filed on Feb. 13, 2014, the entire contents of which are incorporated herein by reference.

FIELD

Embodiments described herein relate generally to an anonymization identifier computing system.

BACKGROUND

There has been a tendency that data owned by a data owner such as a company or an individual person is increasing and becoming more complicated. In many cases, a data owner owns a large amount of data, but does not have analysis skills or an analysis system for such a large amount of data. The analysis skills here indicates expert knowledge of statistics or analysis tools. The analysis system here indicates an analysis tool and a distribution system capable of analyzing a large amount of data at high speed.

Accordingly, when analyzing a large amount of data to use it efficiently, it has been highly likely that the data owner outsources data analysis to a data analyst who has analysis skills or an analysis system.

On the other hand, it is not desirable to easily provide data to a data analyst in view of privacy protection since the data to be analyzed may include personal information.

An anonymization technique is one of techniques providing data to a data analyst while protecting privacy. The anonymization technique is a generic term indicating techniques for converting part of data to be analyzed so as to avoid an individual from being specified from the data to be analyzed.

There are usually no particular problems with the anonymization technique; however, the technique may be improved in term of evaluating the data addition degree while maintaining anonymity when anonymizing original data, based on the present inventor's analysis.

First, based on the inventor's analysis, the data owner has two requirements.

The first requirement is to prevent leakage of private information by minimizing to the greatest extent possible the data, which has been anonymized (anonymized data), that is provided to a data analyst.

The second requirement is to improve accuracy of analysis results.

Generally, the amount of anonymized data is smaller than the amount of original data. In addition, if the amount of anonymized data to be provided to the data analyst is small, the accuracy of the analysis results is lowered. Accordingly, the first and second requirements are inconsistent with each other.

Indicators to quantitatively evaluate the degree of satisfying the first or second requirement have been suggested. For the first requirement, an indicator to quantitatively evaluate the degree of anonymization has been suggested. This indicator is referred to as "anonymization degree". K-anonymity is known as an example of an anonymization degree. K-anonymity is satisfied when any one of combinations of attributes of data has k or more records. In general, the amount of leakage of private information is smaller if a value of k is larger.

For the second requirement, an indicator to evaluate the degree of data loss by anonymization has been suggested. This indicator is referred to as "data loss degree". An example of data loss degree is described in a non-patent document [SPEC] (URL: http://www.meti.go.jp/policy/it_policy/daikoukai/igvp/cp2_jp/common/personal/2009_infra_A_1_External_specifications.pdf), Section 3.10.3.

In order to satisfy both of the first and second requirements, it is necessary to maximize the anonymization degree, and to minimize the data loss degree to the greatest extent possible.

In order to satisfy the second requirement, a larger amount of data is more preferable. Accordingly, it is preferable to add (increase) data later. Patent document 1 (Jpn. Pat. Appln. KOKAI Publication No. 2010-97336) discloses a system in which the degree of avoiding a decrease of anonymization degree is evaluated when data is added, and if the degree falls below the standard that the data owner has determined, a warning is issued.

In this system, it is preferable to not provide added data to the data analyst when the anonymization degree falls under the standard to satisfy the first requirement. Thus, there is an inconvenience in the prior art that only data that does not decrease the anonymization degree can be added, and the accuracy of the analysis results cannot be improved by increasing the amount of data.

This inconvenience will be explained by using specific data as shown in FIG. 15 to FIG. 21.

Data (original data) D that the data owner originally owns is stored in a table containing four items; age, gender, address, and disease, as shown in FIG. 15. It is assumed that the distribution probability of a disease for age, gender, and address is analyzed by using the data. The items to be anonymized are age, gender, and address. That is, it is assumed that an individual cannot be specified by the disease.

To prevent leakage of private information (first requirement), the original data D is anonymized to obtain anonymized data DA1 as shown in FIG. 16, so that the anonymization degree satisfies k=2. It is apparent that k=2 since FIG. 16 shows that two or more rows are present for each of the combinations of age, gender, and address, which are items to be anonymized in the anonymized data DA1. When deriving the anonymized data DA1 from the original data D, two anonymization techniques are used.

One of the techniques is age grouping (in 5-year increments). In the technique of grouping age, age in the original data D is altered to a 5-year interval including the actual age, as shown in the column of age of the anonymized data DA1. For example, age "25" of the top of the table of the original data D is altered to "25-29" including the actual age "25".

Another technique is generalization of address (to prefectures). The address has a hierarchical structure, as shown in FIG. 17. In the technique of generalizing the address, a value in municipality level La3, which is the lowest level of the original data D, is altered to a value in prefecture level La2, which is the second lowest level. For example, the address "Yokohama city" of the top of the table of the original data D is altered to "Kanagawa" which is one level higher than "Yokohama city".

Analyzing the anonymized data DA1, the following results can be obtained:

A person applicable to an attribute combination of "25-29, female, Kanagawa", has a 50% probability of having a cold, and a 50% of probability of having influenza.

A person applicable to an attribute combination of "30-34, male, Kanagawa", has a 100% probability of having rubella.

The attribute combination of "25-29, female, Kanagawa", indicates a record of a person whose age is 25-29, whose gender is female, and whose address is Kanagawa.

However, it is possible that the analysis results of the anonymized data DA1 may have low accuracy since the population for each attribute is two or three people. It is assumed that new data D' is added, as shown in FIG. 18, in order to increase the accuracy of analysis results (second requirement).

Similar to the above, to prevent leakage of private information (first demand), the new data D' is anonymized to obtain anonymized data DA3, as shown in FIG. 19, so that the anonymization degree satisfies k=2. When deriving the anonymized data DA3 from the new data D', two anonymization techniques are used.

One of the techniques is age grouping (in 5-year increments), similar to the above. However, age is grouped by 5-year intervals starting from age of 23 in the anonymized data DA3, instead of starting from age 25.

Another technique is generalizing gender (any). The gender has a hierarchical structure, as shown in FIG. 20. In the technique of generalizing gender, a value in male/female level Ls2 which is the lowest level of the new data D' is altered to a value in undefined (any) level Ls1 which is one level higher than Ls2.

Analyzing the anonymized data DA3 of the new data D', the following results can be obtained:

A person applicable to an attribute combination, "23-27, any, Kanagawa", has a 50% probability of having a fracture, and a 50% of probability of having influenza.

A person applicable to an attribute combination, "28-32, any, Kanagawa", has a 67% probability of having rubella, and a 33% of probability of having a cold.

However, the analysis results of the anonymized data DA3 are obtained based only on the new data D', but not based on the combination of the new data D' and the original data D. This is because the new data D' and the original data D adopt different anonymization techniques, and accordingly, it is difficult to integrate these data. Therefore, the population is not increased even by adding the new data D', and the accuracy of analysis results is not improved (the second requirement is not satisfied).

In contrast, it is assumed that the new data D' is anonymized by the same technique as used for the anonymized data DA1, to obtain anonymized data DA1', as shown in FIG. 21. In the anonymized data DA1', if data in five rows enclosed by broken line DL1 is integrated with the anonymized data DA1, the anonymization degree after integration exhibits k=2 since the same data as in the five rows has been already present in the anonymized data DA1.

However, if data in the other ten rows in the anonymized data DA1' is integrated with the anonymized data DA1, the anonymization degree after integration exhibits k=1 since the same data has not been present in the anonymized data DA1. This decrease in anonymization degree is not preferable in view of the first requirement.

That is, to maintain the anonymization degree after integration, only data in the five rows enclosed by the broken line DL1 among the anonymized data DA1' can be added. This means that only 5 items out of 15 items in the anonymized data DA1' (i.e., one third of the entire data) can be added, and this is not preferable for improving the accuracy of analysis results (second requirement) by adding more data.

Based on the inventor's analysis, it is assumed that whether or not more data can be added while maintaining the anonymization degree depends on the anonymization technique to be applied to the original data. In the aforementioned example, in the case where the new data D' is anonymized by the same technique as used for the original data (anonymized data DA1), the anonymization degree cannot be maintained. However, if the other techniques are used, it may be possible that the number of items of data to maintain the anonymization degree after integration exceeds five. Accordingly, there is a need of evaluating the data addition degree to maintain the anonymization degree when anonymizing the original data.

The problem to be solved by the embodiments is to provide an anonymization indicator computation system that is capable of evaluating the data addition degree to maintain the anonymization degree when anonymizing the original data.

BRIEF DESCRIPTION OF THE DRAWINGS

FIG. 1 is a schematic diagram showing a configuration of an anonymization indicator computation system according to the first embodiment.

FIG. 2 is a schematic diagram showing an example of anonymization policy PA in the first embodiment.

FIG. 3 is a schematic diagram showing an example of anonymized data DA2 in the first embodiment.

FIG. 6 is a schematic diagram showing an example of anonymized data DA2' in the first embodiment.

FIG. 7 is a schematic diagram showing a configuration of an anonymization indicator computation system according to the second embodiment.

FIG. 10 is a schematic diagram showing a computation result table relative to information loss in the anonymized data DA1 in the second embodiment.

FIG. 11 is a schematic diagram showing a computation result table relative to information loss in the anonymized data DA2 in the second embodiment.

FIG. 13 is a schematic diagram showing an example of a probability density function in the third embodiment.

FIG. 15 is a schematic diagram showing an example of general original data.

FIG. 16 is a schematic diagram showing an example of general anonymized data.

FIG. 17 is a schematic diagram showing an example of a general hierarchical structure of an address.

FIG. 18 is a schematic diagram showing an example of general additional data.

FIG. 19 is a schematic diagram showing an example of general anonymized data.

FIG. 20 is a schematic diagram showing an example of a general hierarchical structure of gender.

FIG. 21 is a schematic diagram showing an example of general anonymized data.

DETAILED DESCRIPTION

Figures 4, 5:
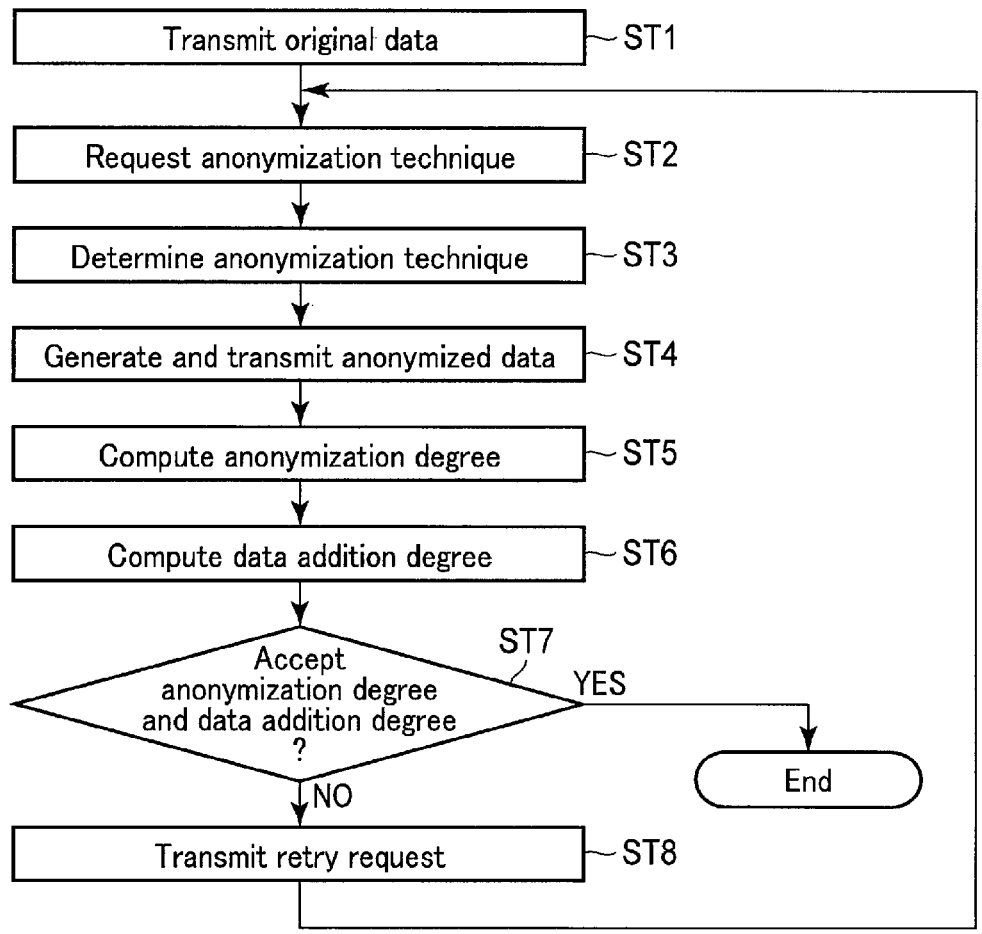
FIG. 4 is a schematic diagram showing an example of data addition degree policy PD in the first embodiment.
FIG. 5 is a flowchart illustrating the operation in the first embodiment.

In general, an anonymization indicator computation system of the embodiment computes anonymization indicators including an anonymization degree and a data addition degree. The anonymization indicator computation system includes a data storing device, an anonymization device, an anonymization degree computation device, and an addition degree computation device.

The data storing device stores original data including a value for each item for each person.

The anonymization device generates anonymized data from the original data by anonymizing values of part of items in the original data.

The anonymization degree computation device computes the anonymization degree indicating a degree of anonymizing data based on the anonymized data.

The addition degree computation device computes the data addition degree indicative of a probability of generating the anonymized data from the original data.

Hereinafter, embodiments will be described with reference to the drawings. Apparatuses described below can be implemented by a hardware configuration, or a combination of hardware resources and software. As software in the combination, a program which is installed from a network or a non-transitory computer-readable storage medium into a computer of an apparatus beforehand, and is executed by a processor of the computer to cause the computer to carry out functions of the apparatus.

[First Embodiment]

FIG. 1 is a schematic diagram showing a configuration of an anonymization indicator computation system according to the first embodiment. An anonymization indicator computation system 100 of the embodiment computes anonymization indicators including an anonymization degree and a data addition degree. The anonymization indicator computation system 100 includes an original data storing database apparatus 110, an anonymization apparatus 120, an anonymization degree computation unit 130, and a data addition degree computation apparatus 150, to perform the computation. The anonymization indicator computation system 100 is not limited to be implemented as a collective of apparatuses. For example, the term of " . . . system 100" may be read as " . . . apparatus 100", the terms of " . . . apparatus 110", " . . . apparatus 120" and " . . . apparatus 150" may be read as " . . . unit 110", " . . . unit 120" and " . . . unit 150", to implement the anonymization indicator computation system 100 as a single apparatus. This is applicable to each of the following embodiments. The term of " . . . unit" is also referred to as " . . . circuit" or " . . . circuitry".

The original data storing database apparatus (data storing device) 110 has a function of storing original data D (as shown in FIG. 15) before anonymization that is owned by a data owner, and a function of transferring the stored original data D to the anonymization apparatus 120. The "original data" is also referred to as "data before anonymization", or simply as "data".

The original data includes a value for each item for each individual. The items may be height, gender, age, etc. The original data may be receipt information including age, gender, address, and disease associated with individuals. In this case, it is preferable to anonymize age, gender, address, etc., but not to anonymize disease, to obtain analysis results regarding a particular disease and to prevent individuals from being specified. In addition, the original data D may adopt a table including information in columns (attributes) and information in rows (records). The columns correspond to respective attributes, and the rows correspond to respective individual records.

The anonymization apparatus (anonymization device) 120 generates anonymized data from the original data D by anonymizing values of part of items in the original data. The anonymization apparatus 120 includes, for example, a data item extraction unit 121, an anonymization unit 122, an anonymization technique determination unit 123, and an anonymization policy storage unit 124.

If a unit merely transfers received information, such a unit may be omitted. For example, if the data item extraction unit 121 merely transfers received information, the data item extraction unit 121 may be omitted. In addition, the omission of a functional unit that merely transfers received information can be applied to each unit in each of the embodiments.

The data item extraction unit 121, the anonymization unit 122, and the anonymization technique determination unit 123 are functional blocks implemented when, for example, a CPU that is not shown in the drawings executes a program including the steps described below.

The anonymization policy storage unit 124 has a function of storing an anonymization policy PA, and a function of transferring the anonymization policy PA to the anonymization technique determination unit 123. The anonymization policy PA is a table including three items: application order, anonymization target item, and anonymization technique. The application order corresponds to the order in which analysis accuracy can be easily maintained. For example, an anonymization technique with which the greatest analysis accuracy is maintained is associated with the first place of the application order. The anonymization target item of the anonymization policy PA indicates an item to be anonymized among items of data D. For example, when target items of the data D are anonymized based on the anonymization techniques "grouping (5-year increments)" and "generalization (prefecture)", which rank "first" in the anonymization order, the anonymized data DA1 is generated as shown in FIG. 16. In addition, when target items of the data D are anonymized based on the anonymization technique, "grouping (10-year increments)", which ranks "second" in the anonymization order, the anonymized data DA2 is generated as shown in FIG. 3.

The anonymization degree computation unit (anonymization degree computation device) 130 has a function of computing an anonymization degree indicating the degree of anonymization performed by the anonymization unit 122, based on the original data D and the anonymized data generated by the anonymization apparatus 120. The computed anonymization degree is sent from the anonymization degree computation unit 130 to a data addition degree determination unit 153.

The data addition degree computation apparatus 150 includes a data addition degree computation unit 151, a data addition degree policy storage unit 152, and the data addition degree determination unit 153.

The data addition degree computation unit (data addition degree computation device) 151 and the data addition degree determination unit (determination device, first control device) 153 are functional blocks implemented when, for example, a CPU not shown in the drawings executes a program including the steps described below.

The data addition degree policy storage unit (anonymization indicator policy storage device) 152 has a function of storing data addition degree policy PD including conditions for anonymization indicators, as shown in FIG. 4, and a function of transferring the data addition degree policy PD in response to a request from the data addition degree determination unit 153. The data addition degree policy (anonymization indicator policy) PD is a table including two items: anonymization indicators; and conditions to be satisfied by the corresponding indicators. The anonymization degree and the data addition degree are selectively applied as an anonymization indicator. The anonymization indicator is not limited thereto, and may include an information loss degree as indicated below. The conditions may include, for example, the range of an anonymization indicator, an upper limit or lower limit of an anonymization indicator. The anonymization indicator may be referred to as an "anonymization evaluation indicator" or "evaluation indicator".

Next, the operation of the anonymization indicator computation system having the aforementioned configuration will be explained with reference to the flowchart shown in FIG. 5.

The data item extraction unit 121 extracts original data D for all items from the original data storing database apparatus 110, and transmits the original data to the anonymization unit 122 (ST1). The data item extraction unit 121 may extract from the original data storing database apparatus 110 original data D including an item and a value corresponding to an item designated by an input unit not shown in the drawings.

The anonymization unit 122 transmits the original data D received at step ST1 to the anonymization technique determination unit 123 to request an anonymization technique to the anonymization technique determination unit 123 (ST2).

The anonymization technique determination unit 123 refers to the anonymization policy PA, and reads an anonymization technique which has not been adopted, and is associated with an anonymization target item in the anonymization policy PA that matches an item in the original data received at step ST2. In addition, the anonymization technique determination unit 123 determines an anonymization technique associated with the highest application order among unadopted anonymization techniques, and reports the determined anonymization technique to the anonymization unit 122. The anonymization technique determination unit 123 stores to a memory (not shown in the drawings) information indicating the determined anonymization technique. The information indicating the determined anonymization technique may be a name of the determined anonymization technique or the application order associated with the determined anonymization technique.

The anonymization unit 122 anonymizes a value of an item matching the anonymization target item in the anonymization policy PA associated with the anonymization technique determined at step ST3 among the original data received at step ST1, to generate anonymized data from the original data D (ST4). Then, the anonymization unit 122 transmits the generated anonymized data to the anonymization degree computation unit 130 and the data addition degree computation unit 151. The anonymization unit 122 stores the generated anonymized data.

The anonymization degree computation unit 130 computes the anonymization degree indicating a degree of anonymizing data based on the anonymized data generated at the anonymization unit 122 (ST5).

The data addition degree computation unit 151 computes the data addition degree corresponding to a probability of generating the anonymized data from the original data. In this example, the data addition degree computation unit 151 computes a data addition degree indicating a degree to which new anonymized data can be added without decreasing the anonymization degree, based on the range that each item in the original data D can cover and the range that each item in the anonymized data covers (ST6).

The data addition degree determination unit 153 reads a data addition degree policy PD including a condition of anonymization degree and a condition of data addition degree from the data addition degree policy storage unit 152. In addition, the data addition degree determination unit 153 determines whether or not to accept the anonymization degree computed at step ST5 and the data addition degree computed at step ST6, based on the data addition degree policy PD. If the determination result shows acceptance, the data addition degree determination unit 153 terminates the processing. If the determination result of step ST7 shows non-acceptance, the data addition degree determination unit 153 proceeds to step ST8.

The data addition degree determination unit 153 controls the anonymization apparatus 120, the anonymization degree computation unit 130, and the data addition degree computation apparatus 150 to retry the processing of steps ST2 to ST7. For example, the data addition degree determination unit 153 transmits a retry request to the anonymization apparatus 120 to request an anonymization technique again (ST8). By this processing, the processing of steps ST2 to ST7 is retried.

The processing of each step will be explained by using specific data as shown in FIG. 2 to FIG. 4 and FIG. 15 to FIG. 17.

In step ST1, The data item extraction unit 121 extracts all items of the original data D from the original data storing database apparatus 110, and transmits the original data D to the anonymization unit 122. The transmitted original data D includes all rows of "items (age, gender, address, disease)".

In step ST2, the anonymization unit 122 requests an anonymization technique from the anonymization technique determination unit 123. The anonymization unit 122 requests an "anonymization technique regarding items (age, gender, address)".

In step ST3, the anonymization technique determination unit 123 determines an anonymization technique based on the anonymization policy PA in the anonymization policy storage unit 124 as shown in FIG. 2, and reports the anonymization technique to the anonymization unit 122. The anonymization technique determination unit 123 reports anonymization techniques, "age grouping (5-year increments)" and "generalization of address (prefecture)", which are associated with the highest application order among unadopted anonymization techniques within the anonymization policy PA to the anonymization unit 122. At the same time, the anonymization technique determination unit 123 stores information indicating that the techniques ranked "first" in the application order have been applied.

In step ST4, the anonymization unit 122 anonymizes the original data based on the reported anonymization techniques, and generates the anonymized data DA1. In the technique of grouping age (5-year increments), an age value is altered to a 5-year interval including the actual value, as shown in the age column of the anonymized data DA1 of FIG. 16. In the technique of generalization of address (prefecture), an address value is altered to a value of the prefecture level La2 in which the actual value is included in the hierarchical address structure as shown in FIG. 17. For example, if a value of an address in municipality level La3 is "Minato-ku", the value "Minato-ku" is altered to "Tokyo" which is a generalization element. Then, the anonymization unit 122 transmits the anonymized data DA1 to the anonymization degree computation unit 130 and the data addition degree computation unit 151. The anonymization unit 122 stores the generated anonymized data DA1. Data items transmitted to the anonymization degree computation unit 130 and the data addition degree computation unit 151 are anonymized target items "age, gender, address" in the anonymization policy PA.

In step ST5, the anonymization degree computation unit 130 computes the anonymization degree based on the anonymized data DA1 received at step ST4. In this processing, a value of k in k-anonymity is adopted as the anonymization degree. As can be seen from the anonymized data DA1, anonymized target items "age, gender, address" can make two or more combinations, and thus, k=2.

In step ST6, the anonymization degree computation unit 151 computes the data addition degree based on the anonymized data DA1 received at step ST4. As described below, the data addition degree is 0.225, i.e., 22.5%.

In step ST7, the data addition degree determination unit 153 refers to the data addition degree policy PD including the condition of anonymization degree, "k=2 or more" and the condition of data addition degree, "40% or more", as shown in FIG. 4. The data addition degree determination unit 153 determines whether or not to accept the computed anonymization degree, "k=2" and the computed data addition degree, "22.5%", based on the data addition degree policy PD. In this example, among the data addition degree policy PD, the anonymization degree satisfies the condition, but the data addition degree does not satisfy the condition. Accordingly, the determination result shows "non-acceptance".

In step ST8, if the determination result shows "non-acceptance", a retry request to retry the processing of steps ST2 to ST7 is transmitted.

In step ST2, the anonymization unit 122 requests an anonymization technique to the anonymization technique determination unit 123. The anonymization unit 122 requests an "anonymization technique with a lower application order".

In step ST3, the anonymization technique determination unit 123 determines an anonymization technique based on the anonymization policy PA, and reports the anonymization technique to the anonymization unit 122. The anonymization technique determination unit 123 reports to the anonymization unit 122 an anonymization technique, "grouping (10-year increments)", which ranks the highest application order except for the stored adopted anonymization techniques (ranking first in the application order) among the anonymization policy PA. At the same time, the anonymization technique determination unit 123 stores information indicating that the technique ranked "second" in the application order has been applied.

In step ST4, the anonymization unit 122 anonymizes the original data D based on the reported anonymization technique, and generates the anonymized data DA2, as shown in FIG. 3. The anonymization unit 122 transmits the generated anonymized data DA2 to the anonymization degree computation unit 130 and to the data addition degree computation unit 151. The anonymization unit 122 stores the anonymized data DA1 to be transmitted. Data items transmitted to the anonymization degree computation unit 130 and the data addition degree computation unit 151 may be anonymization target items "age, gender, address" in the anonymization policy PA or may be only the item "age" which has been re-anonymized.

In step ST5, the anonymization degree computation unit 130 computes the anonymization degree based on the anonymized data DA2 received at step ST4. As can be seen from the anonymized data DA2, anonymization target items "age, gender, address" can make two or more combinations, and thus, k=2.

In step ST6, the anonymization degree computation unit 151 computes the data addition degree based on the anonymized data DA2 received at step ST4. As described below, the data addition degree is 0.55, i.e., 45%.

In step ST7, the data addition degree determination unit 153 refers to the data addition degree policy PD including the condition of anonymization degree, "k=2 or more" and the condition of data addition degree, "40% or more", which is the same as the previous processing. The data addition degree determination unit 153 determines whether or not to accept the computed anonymization degree, "k=2" and the computed data addition degree, "45%", based on the data addition degree policy PD. In this case, both conditions for the anonymization degree and the data addition degree in the data addition degree policy PD are satisfied. Accordingly, the determination result shows "acceptance".

The data addition degree determination unit 153 therefore terminates the processing.

Next, an example of computation of the data addition degree in step ST7 will be explained.

First, the volume of the range that the original data D can take is computed. The volume may be a product of the ranges that each item can take. The ranges that each item can take in the original data D are as described below.

The possible range of ages is 40 options from age 20 to age 59.

The possible range of genders is 2 options of male and female.

The possible range of addresses is 5 options of "Minato-ku", "Fuchu-shi", "Ome-shi", "Yokohama-shi", and "Kawasaki-shi".

The volume of the possible ranges of the original data is a product of the possible ranges of each item: 40×2×5=400.

Next, the volume of the range that the anonymized data, from which the data addition degree is to be computed, is calculated.

The anonymized data DA1 used in the first turn of step ST6 has the values indicated below. In the following, "25-29, male, Tokyo" indicates a person of age within the range of 25 and 29, male, and living in Tokyo.

"25-29, male, Tokyo",
"25-29, female, Kanagawa",
"30-34, male, Kanagawa",
"35-39, female, Tokyo",
"40-44, female, Kanagawa",
"45-49, male, Tokyo",
"50-54, male, Tokyo"

For example, the first row, "25-29, male, Tokyo", has five age options from age 25 to age 29; one gender option, male; and three address options, Minato-ku, Fuchu-shi, and Ome-shi" as shown in FIG. 17. Accordingly, the volume is a product of the possible ranges of each item, 5×1×3=15. Similarly, the volumes of the other six rows are 10, 10, 15, 10, 15, and 15 from the top of the list. The seven rows do not overlap in values of the ranges. Thus, the volume of the range that the anonymized data DA1 takes is a sum of the product of 7 rows, 15+10+10+15+10+15+15=90.

If original data is newly added, and the anonymization result of the added original data is within the range of the anonymized data DA1, the anonymization degree maintains k=2. On the other hand, if the anonymization result of the added original data is over the range of the anonymized data DA1, the anonymization degree decreases. Accordingly, the probability that new data can be added to the anonymized data DA1 without decreasing the anonymization degree can be evaluated by a value obtained by dividing the range of value (volume) that the anonymized data DA1 takes by the range (volume) that the original data can take. In the aforementioned example, the probability is 90/400=0.225. This probability is the data addition degree in the first turn of step ST6.

The values of the anonymized data DA2 used in the second turn of step ST6 are as described below.

"Twenties, male, Tokyo",
"Twenties, female, Kanagawa",
"Thirties, male, Kanagawa",
"Thirties, female, Tokyo",
"Forties, male, Tokyo",
"Forties, female, Kanagawa",
"Fifties, male, Tokyo"

The volumes of values in each row are 30, 20, 20, 30, 30, 20 and 30 from the top of the list. Thus, the volume of the range that the anonymized data DA2 takes is a sum of the product of 7 rows, 30+20+20+30+30+20+30=180.

Accordingly, the data addition degree of the anonymized data DA2 is 280/400=0.45.

The effect of data addition degree will be explained with reference with FIGS. 6, 18 and 21.

It is assumed that new data D' is added, as shown in FIG. 18. If the 0 added new data D' is anonymized by the same technique as used for the anonymized data DA1 of the original data D, anonymized data DA1' is obtained as shown in FIG. 21. In order to add the anonymized data DA1' without decreasing the anonymization degree of the anonymized data DA1 of the original data D, only data in five rows enclosed by broken lines DL1 can be added to the anonymized data DA1. The data in the five rows corresponds to 5/15=33% of the new data D'.

If the added new data D' is anonymized by the same technique as used for the anonymized data DA2, anonymized data DA2' is obtained as shown in FIG. 6. In order to add the anonymized data DA2' without decreasing the anonymization degree of the anonymized data DA2 of the original data D, only data in 13 rows enclosed by broken lines DL2 can be added to the anonymized data DA2. The data in the 13 rows corresponds to 13/15=87% of the new data D'.

The data addition degrees, 22.5% and 45%, obtained in this embodiment are different from the ratio of data that has been actually added. However, it can be understood relatively that only a lesser amount of data can be added for the low data addition degree, 22.5%, and a greater amount of data can be added for the high data addition degree, 45%.

As stated above, according to the present embodiment, the data addition degree corresponding to the probability of generating the anonymized data from the original data is computed. With this configuration, the degree that data can be added while maintaining the anonymization degree can be evaluated when anonymizing the original data.

It should be noted that the anonymized data to be provided to the data analyst from the data owner has the anonymization degree which satisfies or exceeds a value determined in the data addition degree policy PD, which is a requisite minimum. In addition, due to the configuration in which the data additional degree indicating the degree to which data can be added in the future is computed, an anonymization technique with which more data can be added can be selected.

In addition, according to the present embodiment, in the case where the data addition degree determination unit 153 determines whether or not to accept the computed anonymization degree and the computed data addition degree, based on the anonymization indicator policy, an operator's for determination workload can be reduced.

Furthermore, according to the present embodiment, if the determination result shows acceptance, the processing is terminated. If the determination result shows non-acceptance, the anonymization apparatus 120, the anonymization degree computation unit 130, and the data addition degree computation apparatus 150 can be controlled to retry the processing. This facilitates generating the anonymized data that satisfies the anonymization indicator policy.

[Second Embodiment]

FIG. 7 is a schematic diagram showing a configuration of an anonymization indicator computation system according to the second embodiment. The elements same as those in FIG. 1 are indicated by the same reference symbols, and the explanation thereof is omitted. The elements different from those in FIG. 1 will be explained below. In the following embodiments, the elements having the same functions will not be explained.

The second embodiment is a variation example of the first embodiment which uses anonymization indicators including the anonymization degree and the data addition degree, and deals with the case where the anonymization indicators further includes the information loss degree.

Specifically, the anonymization indicator computation system 100 comprises an information loss degree computation unit 140, in addition to the configuration shown in FIG. 1, if the anonymization indicators include an information loss degree.

The information loss degree computation unit (information loss degree computation device) 140 computes an information loss degree indicating the degree of information loss due to anonymization, based on the anonymized data and the original data.

Figures 8, 9:
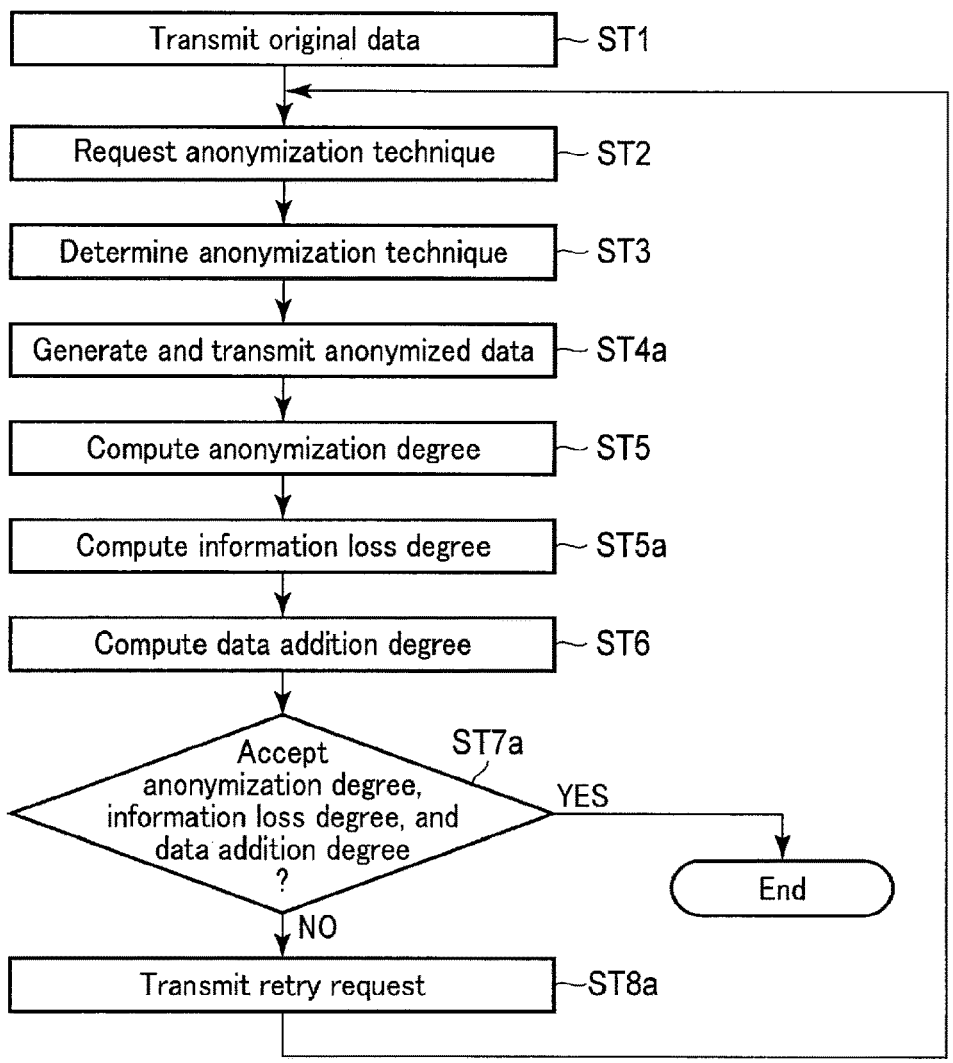
FIG. 8 is a schematic diagram showing an example of data addition degree policy PD' in the second embodiment.
FIG. 9 is a flowchart illustrating the operation in the second embodiment.

Accordingly, the data addition degree policy (anonymization indicator policy) PD' further includes a condition of information loss degree, as shown in FIG. 8. The condition of information loss degree indicates a condition that the information loss degree should satisfy.

The data addition degree determination unit (determination device) 153 determines whether or not to accept a computed anonymization degree, a computed data addition degree, and a computed information loss degree, based on the data addition degree policy PD'.

If the determination result shows acceptance, the data addition degree determination unit (second control device) 153 terminates the processing. If the determination result shows non-acceptance, the data addition degree determination unit 153 controls the anonymization apparatus 120, the anonymization degree computation unit 130, the data addition degree computation apparatus 150, and the information loss degree computation unit 140 to retry the processing.

Next, the operation of the anonymization indicator computation system having the aforementioned configuration will be explained with reference to the flowchart shown in FIG. 9.

Steps ST1 to ST3 are executed in the manner similar to steps ST1 to ST3 of the first embodiment.

In step ST4a, the anonymization unit 122 transmits the generated anonymized data to the information loss degree computation unit 140, in addition to step ST4 of the first embodiment.

Step ST5 is executed in the manner similar to step ST5 of the first embodiment.

In step ST5a, the information loss degree computation unit 140 computes the information loss degree based on the anonymized data received at ST4a.

Step ST6 is executed in the manner similar to step ST6 of the first embodiment.

In step ST7a, the data addition degree determination unit 153 reads from the data addition degree policy storage unit 152 the data addition degree policy PD' including the condition of the anonymization degree, the condition of the data addition degree, and the condition of the information loss degree. In addition, the data addition degree determination unit 153 determines whether or not to accept the anonymization degree computed at step ST5, the data addition degree computed at step ST6, and the information loss degree computed at step ST5a, based on the data addition degree policy PD'. If the determination result shows acceptance, the data addition degree determination unit 153 terminates the processing. If the determination result of step ST7a shows non-acceptance, the data addition degree determination unit 153 proceeds to step ST8a.

The data addition degree determination unit 153 controls the anonymization apparatus 120, the anonymization degree computation unit 130, the information loss degree computation unit 140, and the data addition degree computation apparatus 150 to retry the processing of steps ST2 to ST7. For example, the data addition degree determination unit 153 transmits to the anonymization apparatus 120 a retry request to request an anonymization technique again (ST8a). By this processing, the processing of steps ST2 to ST7 is retried.

The processing of each step will be explained by using specific data as shown in FIG. 2 to FIG. 3, FIG. 8, FIG. 10 to FIG. 11, and FIG. 15 to FIG. 16.

The original data D in the original data storing database apparatus 110 and the anonymization policy PA in the anonymization policy storage unit 124 are the same as those in the first embodiment, as shown in FIGS. 15 and 2. Unlike the first embodiment, the data addition degree policy storage unit 152 has the data addition degree policy PD' further including the condition of information loss degree, as shown in FIG. 8.

Steps ST1 to ST3, ST4a, and ST5 are executed in the manner similar to those described before.

In step ST5a, the information loss degree computation unit 140 computes the information loss degree based on the anonymized data received at ST4a. The technique described in the non-patent document [SPEC], section 3.10.3 is adopted for the information loss degree. The information loss of age, which is numerical information, is computed by the technique described in the non-patent document [SPEC], section 3.10.3, (1).

That is, the data loss of numerical value can be obtained by dividing the finite difference, $|v1-v2|$, between a value $v1$ before anonymization and a value $v2$ after anonymization of a target item, by a range $Ni$ represented by the finite difference between the maximum value and the minimum value before anonymization. The data loss of numerical value is given by $|v1-v2|/Ni$.

For example, the range $Ni$ of age in the original data D is represented by the finite difference between the maximum value and the minimum value before anonymization, 54−25=29. In this case, the information loss of age in the anonymized data DA1 is computed as $|v1-v2|/29$, as shown in the age column in the computation result table T1 of FIG. 10.

The information loss of gender, which is text type information (with generalization hierarchy information), is computed in accordance with the technique described in the non-patent document [SPEC], section 3.10.3, (3). That is, the information loss of text type information is obtained by dividing the finite difference between the hierarchical levels before and after anonymization by the level of generalization hierarchy. If it is assumed that the lowest level (male/female) is 0, the generalization level (any) is 1. The finite difference between levels before and after anonymization is 0 for all rows. In this case, the information loss of gender in the anonymized data DA1 is computed as 0/1, as shown in the gender column in the computation result table T1 of FIG. 10.

The information loss of address, which is text type information (with generalization hierarchy information), is computed in accordance with the technique described in the non-patent document [SPEC], section 3.10.3, (3). The information loss of text type information is obtained by dividing the finite difference between the hierarchical levels before and after anonymization by the level of generalization hierarchy, similar to the above. If it is assumed that the lowest level (Minato-ku/Fuchu-shi/Ome-shi/Kawasaki-shi/Yokohama-shi) is 0, the generalization level (Japan) is 2. The finite difference between levels before and after anonymization is 1 for all rows. In this case, the information loss of gender in the anonymized data DA1 is computed as 1/2, as shown in the address column in the computation result table T1 of FIG. 10.

Lastly, the average of the information loss is computed from the computation result table T1. Based on the technique described in the non-patent document [SPEC], section 3.10.3, (4), the sum of all the values in the computation result table T1 is divided by a value obtained by multiplying the number of anonymization target items by the number of rows, which is 3×15=45. The average is 0.20. Accordingly, the information loss degree is 0.20, i.e., 20%.

Step ST6 is executed in the manner similar to that described before.

In step ST7a, the data addition degree determination unit 153 reads from the data addition degree policy storage unit 152 the data addition degree policy PD' including the condition of the anonymization degree, "k=2 or more", the condition of the data addition degree, "40% or more", and the condition of the information loss degree "30% or less". In addition, the data addition degree determination unit 153 determines whether or not to accept the anonymization degree, "k=2 or more", computed at step ST5, the data addition degree, "22.5%" computed at step ST6, and the information loss degree, "20%", computed at step ST5a, based on the data addition degree policy PD'. In this example, among the data addition degree policy PD', the anonymization degree and the information loss degree satisfy the respective conditions, but the data addition degree does not satisfy the condition. Accordingly, the determination results indicates non-acceptance.

In step ST8a, the processing of steps ST2 to ST7a is retried, as stated above.

Steps ST1 to ST3, ST4a, and ST5 are executed in the manner similar to those described before.

In step ST5a, the information loss degree computation unit 140 computes the information loss degree based on the anonymized data DA2 received at ST4a, as shown in FIG.

8. Regarding the anonymized data DA2, a computation result table T2 of FIG. 11 indicates the information loss of age computed by $|v1-v2|/Ni$, the information loss of gender, and the information loss of address computed as stated above. In a manner similar to the above, the average of the information loss is computed from the computation result table T2. The sum of all the values in the computation result table T2 is divided by 45 (=15 (the number of anonymization target items)×3 (the number of rows)), and the average of 0.23 is obtained. Accordingly, the information loss degree is 0.23, i.e., 23%.

Step ST6 is executed in the manner similar to that described before.

In step ST7a, the data addition degree determination unit 153 reads from the data addition degree policy storage unit 152 the data addition degree policy PD' including the condition of the anonymization degree, "k=2 or more", the condition of the data addition degree, "40% or more", and the condition of the information loss degree "30% or less". In addition, the data addition degree determination unit 153 determines whether or not to accept the anonymization degree, "k=2", computed at step ST5, the data addition degree, "45%" computed at step ST6, and the information loss degree, "23%", computed at step ST5a, based on the data addition degree policy PD'. In this example, all the conditions in the data addition degree policy PD' are satisfied, accordingly, the determination results indicates acceptance.

The data addition degree determination unit 153 therefore terminates the processing.

As stated above, according to the present embodiment, the information loss degree indicating the degree of information loss due to anonymization is computed, thereby controlling the information loss due to anonymization to be within a predetermined range, in addition to the advantages obtained in the first embodiment.

It should be noted that the data to be provided to the data analyst from the data owner has the anonymization degree which satisfies a value determined in the data addition degree policy PD or more, which is at the requisite minimum. The data owner can obtain a desired analysis accuracy since the information loss degree satisfies or is less than the value determined in the policy, and can select an anonymization technique to add more data in consideration of the data addition degree indicating how much data can be added in the future.

In addition, according to the present embodiment, in the case where the data addition degree determination unit 153 determines whether or not to accept the computed anonymization degree, the computed data addition degree, and the computed information loss degree, based on the anonymization indicator policy, an operator's determination workload can be reduced.

Furthermore, according to the present embodiment, if the determination result shows acceptance, the processing is terminated. If the determination result shows non-acceptance, the anonymization apparatus 120, the anonymization degree computation unit 130, the information loss degree computation unit 140, and the data addition degree computation apparatus 150 can be controlled to retry the processing. This facilitates generating the anonymized data that satisfies the anonymization indicator policy.

[Third Embodiment]

Figure 12:
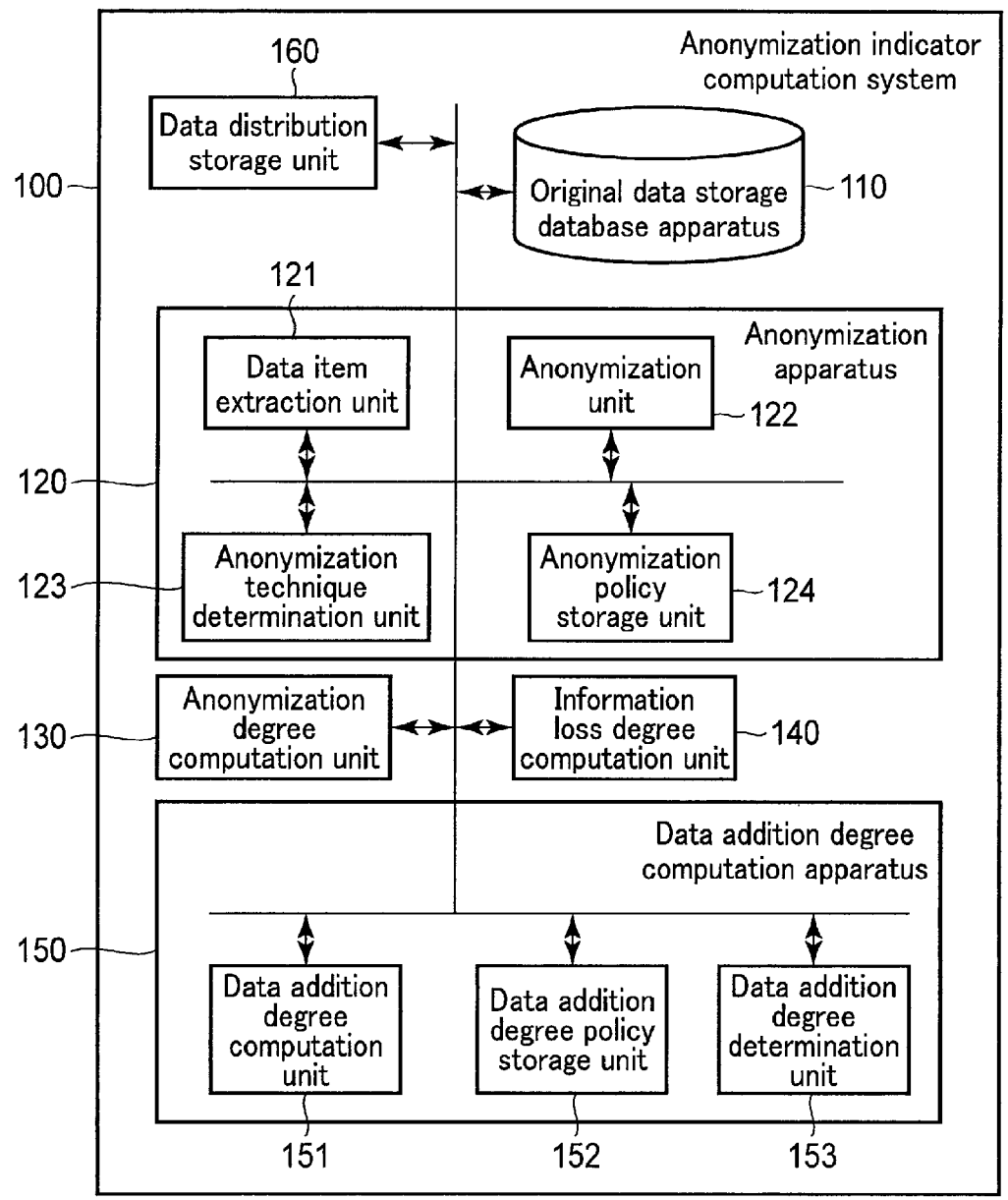
FIG. 12 is a schematic diagram showing a configuration of an anonymization indicator computation system according to the third embodiment.

FIG. 12 is a schematic diagram showing a configuration of an anonymization indicator computation system according to the third embodiment.

The third embodiment is a variation example of the first embodiment which assumes that the original data has a uniform distribution, i.e., the original data has values distributed corresponding to the known probability density function.

Specifically, the anonymization indicator computation system 100 further includes a data distribution storing unit 160, in addition to the configuration shown in FIG. 1.

The data distribution storing unit 160 stores a table T3 indicating the probability density function of the original data within the original data storing database apparatus 110, as shown in FIG. 13.

The table T3 indicates the probability density value for the range of age, gender, and address defined in each row in a column of "value". For example, in the case where age is "20-22", gender is "any", and address is "any", the probability density value is 0. In the case where age is "23-24", gender is "any", and address is "any", the probability density value is 0.05. It is assumed that values are uniformly distributed within the range indicated in each row of the table T3. For example, for the third row from the top of the table T3, in which the age is "25-29", gender is "male", and address is "any", the probability density value is 0.10. The values of 5×1×1=25 ways are included in the range. The probability density value of each of the 25 ways (for example, the age is 26, gender is male, and address is Yokohama-shi) is 0.10/25=0.004.

The data addition degree computation unit 151 computes the data addition degree corresponding to a probability of generating the anonymized data from the original data, based on the anonymized data generated at the anonymization apparatus 120 and the table T3 within the data distribution storing unit 160.

Figure 14:
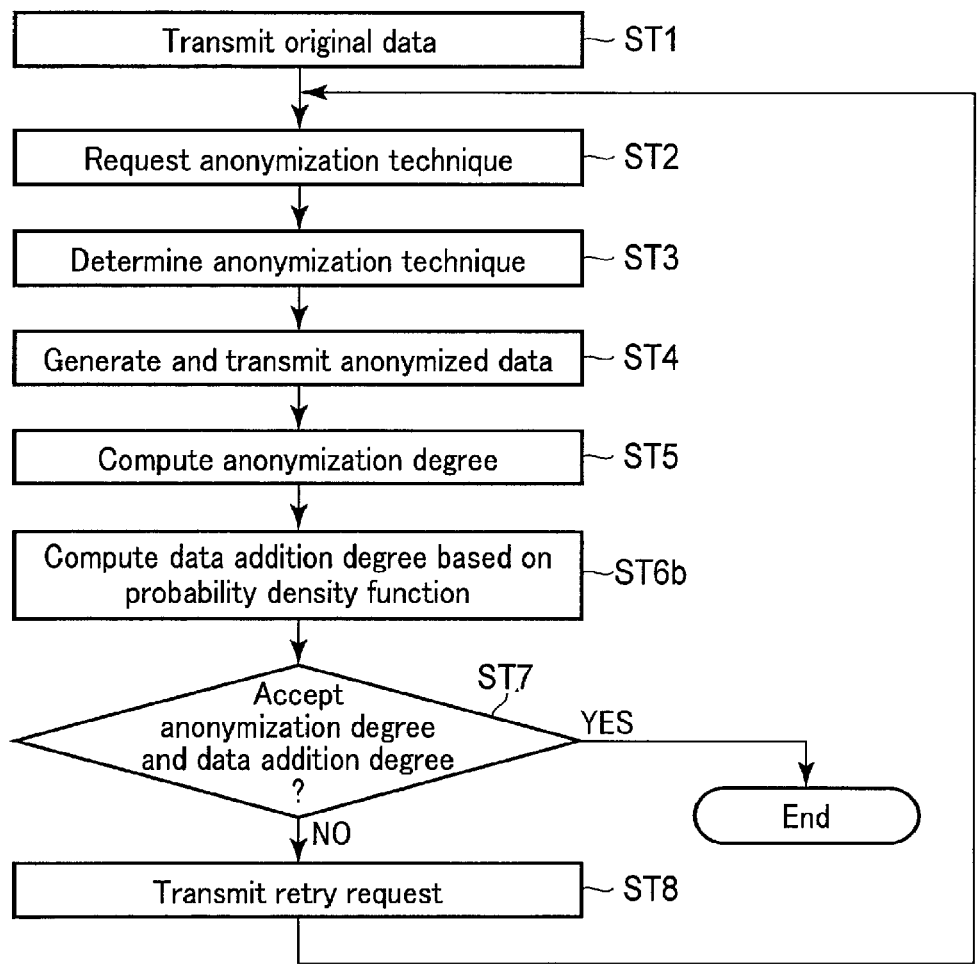
FIG. 14 is a flowchart illustrating the operation in the third embodiment.

Next, the operation of the anonymization indicator computation system having the aforementioned configuration will be explained with reference to the flowchart shown in FIG. 14. The processing of each step will be explained by using specific data as shown in FIG. 3 and FIG. 15 to FIG. 16.

Steps ST1 to ST5 are executed in the manner similar to steps ST1 to ST5 of the first embodiment.

In step ST6b, the data addition degree computation unit 151 computes the data addition degree corresponding to a probability of generating the anonymized data DA1 from the original data D. In this example, the anonymization degree computation unit 151 computes the data addition degree based on the anonymized data DA1 received at step ST4, as shown in FIG. 16, and the table T3 read from the data distribution storing unit 160, as shown in FIG. 13. As described below, the data addition degree is 0.3025, i.e., 30.25%.

As a result of determination in step ST7, the anonymization degree satisfies the condition, but the data addition degree does not satisfy the condition of "40% or more", which is similar to the first embodiment. Accordingly, the determination result shows "non-acceptance". Then, the processing is returned to step ST2, and the processing of steps ST2 to ST7 is retried, similar to the first embodiment. During retry, the second turn of steps ST2 to ST5 are executed in the manner similar to those of the first embodiment.

In step ST6b, the data addition degree computation unit 151 computes the data addition degree corresponding to a probability of generating the anonymized data DA2 from the original data D. In this example, the anonymization degree computation unit 151 computes the data addition degree based on the anonymized data DA2 received at step ST4, as shown in FIG. 3, and the table T3 read from the data distribution storing unit 160, as shown in FIG. 13. As described below, the data addition degree is 0.49, i.e., 49%.

As a result of determination in step ST7, both of the anonymization degree and the data addition degree satisfy the conditions, similar to the first embodiment. Accordingly, the determination result shows acceptance.

The data addition degree determination unit 153 therefore terminates the processing.

Next, an example of computation of the data addition degree in step ST6b will be explained.

The data addition degree computation unit 151 computes the probability of the range that the anonymized data takes from a probability density function f indicated in the table T3, and sets the computed probability as the data addition degree.

The anonymized data DA1 used in the first turn of step ST6b has the values indicated below.
"25-29, male, Tokyo",
"25-29, female, Kanagawa",
"30-34, male, Kanagawa",
"35-39, female, Tokyo",
"40-44, female, Kanagawa",
"45-49, male, Tokyo",
"50-54, male, Tokyo"

For example, for the first row, "25-29, male, Tokyo", since the table T3 shows that the probability density of the case where the age is "25-29", gender is "male", and address is "any" is 0.10, the probability is 0.10×3/5=0.06. The probability density is multiplied by "3/5" for the following reason:

Since the first row indicates address, "Tokyo"; on the other hand, the address of the probability density function f is "any", it is necessary to divide the number of municipalities included in "Tokyo", which is 3, by the number of municipalities included in "any", which is 5.

For the third row, "30-34, male, Kanagawa", since the table T3 shows that the probability density is 0.35 of the case where the age is "30-39", gender is "any", and address is "any", the probability is 0.35×5/10×1/2×2/5=0.035. The probability density is multiplied by "5/10", "1/2" and "2/5", since the ranges of age, gender, and address of the third row are narrower than the ranges of age, gender, and address of the probability density function f. For example, the probability density function f shows that age is "30-39", gender is "any", and address is "any". On the other hand, the third row shows that age is "30-34", gender is "male", and address is "Kanagawa". Accordingly, the possible range of age is 5/10, the possible range of gender is 1/2, and the possible range of address is 2/5 for the third row.

By performing the similar calculation, the probability can be computed for the other rows, as follows (from the top of the list):

$$0.10 \times 3/5 = 0.06$$

$$0.05 \times 2/5 = 0.02$$

$$0.35 \times 5/10 \times 1/2 \times 2/5 = 0.035$$

$$0.35 \times 5/10 \times 1/2 \times 3/5 = 0.0525$$

$$0.30 \times 5/10 \times 1/2 \times 2/5 = 0.03$$

$$0.30 \times 5/10 \times 1/2 \times 3/5 = 0.045$$

$$0.10 \times 3/5 = 0.06$$

The probability of the possible range of the anonymized data DA1 is a sum of the probabilities of the seven rows, which is 0.06+0.02+0.035+0.0525+0.03+0.045+0.06=0.3025. The computed probability is the data addition degree of the anonymized data DA1.

Similarly, the anonymized data DA2 used in the second turn of step ST6b has the values indicated below.
"Twenties, male, Tokyo",
"Twenties, female, Kanagawa",
"Thirties, male, Kanagawa",
"Thirties, female, Tokyo",
"Forties, male, Tokyo",
"Forties, female, Kanagawa",
"Fifties, male, Tokyo"

The probability can be computed for the rows, as follows (from the top of the list):

$$(0.05 \times 1/2 + 0.10) \times 3/5 = 0.075$$

$$(0.05 \times 1/2 + 0.05) \times 2/5 = 0.03$$

$$0.35 \times 1/2 \times 2/5 = 0.07$$

$$0.35 \times 1/2 \times 3/5 = 0.105$$

$$0.30 \times 1/2 \times 3/5 = 0.09$$

$$0.30 \times 1/2 \times 2/5 = 0.06$$

$$0.10 \times 3/5 = 0.06$$

The probability of the possible range of the anonymized data DA2 is a sum of the probabilities of the seven rows, which is 0.075+0.03+0.07+0.105+0.09+0.06+0.06=0.49. The computed probability is the data addition degree of the anonymized data DA2.

Similar to the first embodiment, the case where new data D' is added is considered below. If the added new data D' is anonymized by the same technique as used for the anonymized data DA1 of the original data D, the rate at which the new data can actually be added is 33%. The rate becomes 87% if the new data is anonymized by the same technique as used for the anonymized data DA2.

The data addition degrees for the anonymized data DA1 and the anonymized data DA2 computed in the first embodiment are 22.5% and 45%, respectively, and those computed in the third embodiment are 30.25% and 49%, respectively. Accordingly, the data addition degrees computed in the third embodiment (30.25% and 49%) are closer to the rate that the new data can actually be added (33% and 87%), in comparison with the data addition degrees computed in the first embodiment (22.5% and 45%).

As stated above, according to the present embodiment, the data addition degree corresponding to the probability of generating the anonymized data from the original data D is computed, based on the probability density function of the original data. With this configuration, a more accurate data addition degree can be computed in comparison with the first embodiment.

The third embodiment is explained as a variation example of the first embodiment. However, the third embodiment can be implemented as a variation example of the second embodiment.

As stated above, according to at least one embodiment, the data addition degree corresponding to the probability of generating the anonymized data from the original data is computed. With this configuration, the degree that data can be added while maintaining the anonymization degree can be evaluated when anonymizing the original data.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each of the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An anonymization indicator computation system that computes anonymization indicators including an anonymization degree and a data addition degree, the anonymization indicator computation system comprising:
    a data memory configured to store original data including a value for each item for each individual;
    processing circuitry configured to:
    generate anonymized data from the original data by anonymizing values of part of items in the original data;
    compute the anonymization degree indicating a degree of anonymizing data based on the anonymized data; and
    compute the data addition degree indicative of a probability of generating the anonymized data from the original data; and
    an anonymization indicator policy memory configured to store an anonymization indicator policy including a condition of the anonymization degree and a condition of the data addition degree; and
    the processing circuitry further configured to determine whether or not to accept the computed anonymization degree and the computed data addition degree, based on the anonymization indicator policy.

2. The anonymization indicator computation system according to claim 1, further comprising:
    a first controller configured to terminate processing when a result of determination by the processing circuitry indicates acceptance, and to control the processing circuitry to retry processing when the result of determination indicates non-acceptance.

3. The anonymization indicator computation system according to claim 1, further comprising:
    the processing circuitry configured to compute an information loss degree indicating a degree of information loss due to the anonymization, based on the anonymized data and the original data, if the anonymization indicators include the information loss degree,
    wherein the anonymization indicator policy further includes a condition of the information loss degree, and
    the processing circuitry determines whether or not to accept the computed anonymization degree, the computed data addition degree, and the computed information loss degree, based on the anonymization indicator policy.

4. The anonymization indicator computation system according to claim 3, further comprising:
    a second controller configured to terminate processing when a result of determination by the processing circuitry indicates acceptance, and to control the processing circuitry to retry processing when the result of determination indicates non-acceptance.

* * * * *